Feb. 2, 1932.  H. D. ELSE  1,843,712
CLUTCH QUIETING MEANS
Filed April 2, 1931
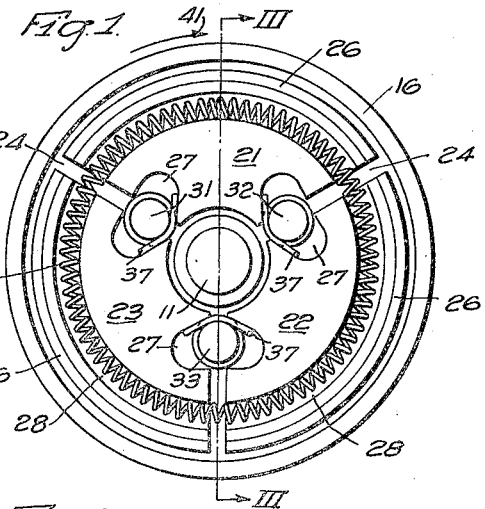
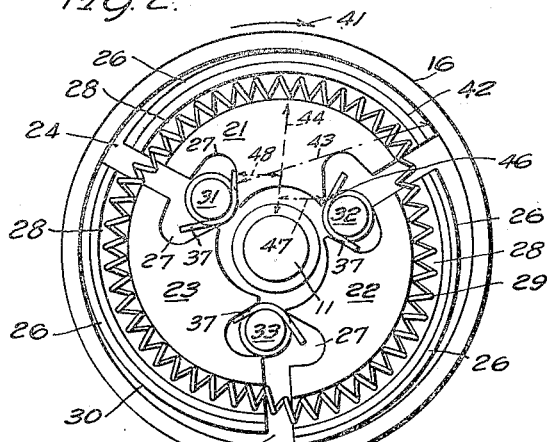
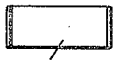
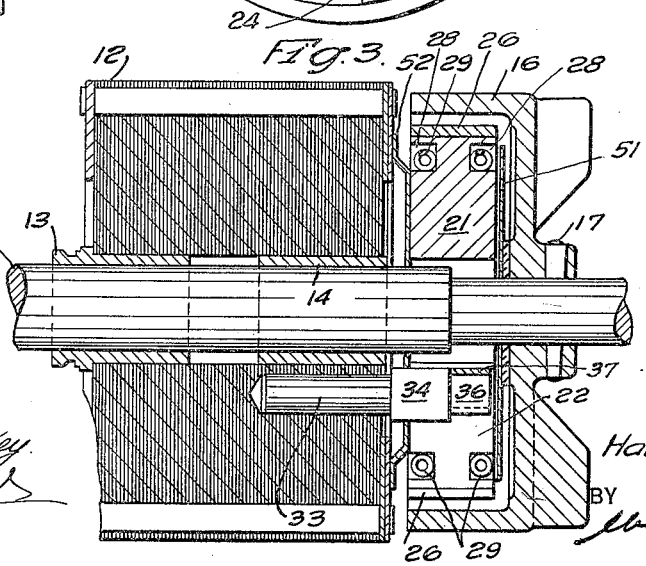
WITNESSES.
E. A. McCloskey
H. M. Bieber
INVENTOR
Harry D. Else.
BY
Wesley L. Carr
ATTORNEY Patented Feb. 2, 1932

1,843,712

UNITED STATES PATENT OFFICE

HARRY D. ELSE, OF SPRINGFIELD, MASSACHUSETTS, ASSIGNOR TO WESTINGHOUSE ELECTRIC & MANUFACTURING COMPANY, A CORPORATION OF PENNSYLVANIA

CLUTCH QUIETING MEANS

Application filed April 2, 1931. Serial No. 527,191.

My invention relates to clutches and particularly to centrifugally-actuable clutches.

It is an object of my invention to provide a relatively simple and highly efficient clutch-quieting means under pulsating-torque conditions of operation.

The particular device embodying my invention is operatively associated with a centrifugally-actuable clutch of the kind disclosed and claimed by me in application, Serial No. 433,930, filed March 7, 1930 and assigned to the Westinghouse Electric & Manufacturing Company. In that clutch, I have disclosed the use of a plurality of substantially similar centrifugally-actuable weights located within a driven shell, each weight being provided with recesses of substantially V-shape, in each radial edge, the driving pins extending into the adjacent pairs of recesses, and each pin driving a leading weight.

It has been found that there is a tendency of the weights to rattle on the driving pins if no additional quieting means is provided and I have found that it is possible to provide a very simple and highly efficient quieting means in a clutch of this type.

In practicing my invention, I provide a small leaf spring operatively associated with each pin and the adjacent pair of weights, the spring being initially effective uniformly upon the weights of each pair and then being differentially effective upon the weights of each pair under normal operating conditions.

Figure 1 is a view, in end elevation, of a clutch with which is associated the device embodying my invention, the parts being shown in the relative positions which they occupy at zero speed, Fig. 2 is a view similar to Fig. 1 but with the parts shown in their operative positions, at normal speed.

Fig. 3 is a view, in axial section, through a rotor having a centrifugally-actuable clutch associated therewith, the section through the clutch being taken on the line III—III of Fig. 1, and Figs. 4 and 5 are views, in end elevation and in plan, respectively, of a clutch-quieting means particularly embodying my invention.

A rotor shaft 11 has the rotor 12 of an alternating-current motor loosely mounted thereon, a squirrel-cage rotor being shown, although the device embodying my invention is not limited, in its use, to a rotor of that type. A pair of spaced bushings 13 and 14 fit tightly into the rotor 12 and loosely on the shaft 11, suitable means (not shown) being provided to prevent axial movement of the rotor relative to the shaft.

A driven shell 16 is rigidly secured on the shaft 11 by a taper pin 17. I do not desire, however, to be limited to the used of a taper pin, as any other suitable means for rigidly securing the shell 16 is the shaft may be utilized.

A plurality of similar weights 21, 22 and 23 are located within the shell 16 and are of substantially segmental shape, the peripheral extent of each weight being slightly less than 120° to provide a clearance space 24 between the adjacent radial edges of each two weights. The outer peripheral surface of each weight has a facing 26 of a wear-resisting material secured thereto, in a manner well known in the art. Each weight is provided with recesses 27, each of approximately V-shape, adjacent to the inner corners thereof, and particularly in their radial edges or faces.

Each weight is provided with an arcuate recess 28 in each end face in which garter springs 29 are located to yieldingly hold the weights in the positions shown, particularly in Fig. 1 of the drawings.

A plurality of driving pins 31, 32 and 33 are provided having portions thereof fitting tightly into the rotor-core structure 12 and having projecting portions 34 of a predetermined diameter and additional portions 36 of a slightly reduced diameter extending into the pairs of recesses 27, as shown in the drawings.

Fig. 1 of the drawings illustrates the parts at zero speed and it may be noted that the effect of the garter springs 29 is to cause a radially inner wall of a recess 27 to engage the portion 34 of the pin at a radially outer portion thereof and to yieldingly press the weight against the pin.

If no additional means is provided for preventing a rattle of the weight on the pin, there will be some noise, under certain operating conditions, particularly in case of a pulsating torque of the driving pins, such as may occur when a clutch of this type is used on a single-phase motor of a fractional-horsepower size, in which the rotating field is of general elliptical shape, whereby the driving pins may be operated at a pulsating torque.

The device embodying my present invention is shown particularly in Figs. 4 and 5 of the drawings and embodies a leaf spring 37 which is bent to arcuate shape, as shown in Fig. 4, to operatively engage portion 36 of any one pin. By reference to Fig. 1 of the drawings, it will be noted that, at all speeds below a predetermined value, the positions of the weights relative to the pins is symmetrical and uniform and that the ends of the respective springs 37 engage an inner-wall portion of adjacent recesses 27 while the mid-portion of each spring engages a pin. It may, however, also use a leaf spring 37 which is much wider and fits on a pin 31, 32 or 33 the diameter of which is substantially that of portion 36 over its entire projecting portion.

Let it be assumed that a stator structure associated with rotor 12 is energized, in the usual manner, to cause the rotor 12 to come up to speed and, for purposes of definiteness, we may assume that we are dealing with a 4-pole motor on a 60-cycle circuit, in which case, the clutch will be set to cause engagement between the weights and the shell at substantially 1300 R. P. M. When the rotor 12 and the weight assembly driven thereby, reach or pass through this speed, the weights will move outwardly against the shell and then be forced backwardly against a trailing driving pin, the leading end of any one weight engaging with the shell and setting up a pressure which, in the case of rotation in a clockwise direction, as indicated by the arrow 41, will be in a direction from the leading outer peripheral portion 42 of weight 21 against the axis of driving pin 31, as shown generally by the broken line 43 in Fig. 2 of the drawings. As long as a relatively heavy torque is transmitted, the value of the force indicated by the broken line 43 is so large that weight 21 will be held firmly against pin 31, and no rattle therebetween will occur. If, however, the load is light, as will be in the case if, the motor is running under moderate or no-load conditions, the resultant of the forces indicated by line 43, the action of the garter springs and the centrifugal effect of the weight is represented by the broken line 44 in Fig. 2 and tends to hold each weight against its driving pin but may not be of sufficient value to overcome the tendency of a weight to rattle on its pin by reason of successive pulsating torque impulses provided by the energizing stator transmitting through the rotor.

Weight 21, which is taken, for purposes of illustration, as representative of all the weights, is moved to the position shown in Fig. 2 of the drawings, and its tilted position causes the spring 37, associated with pin 32, to engage the wall of the recess at point 46, the reaction of the spring being represented by the broken line 47. At the trailing end of weight 21, the pressure of the weight against the leaf spring tends to concentrate near the outer end of the spring, and the reaction thereof is represented by the broken line 48. As the two leaf-spring portions are of equal strength, the force represented by line 47 will be greater than that represented by line 48, as the contacting point 46 is located closer to the fulcrum of the spring. There is, therefore, a difference between the forces 47 and 48 which is effective to hold a weight in direct and tightly wedged interfitting relation with the driving pin. It has been found, by actual experiment and use, that properly designed springs 37 will entirely eliminate the rattle which would occur at light loads, if such springs were not utilized.

The device, more particularly embodying my invention, thus provides means of a resilient nature for opposing the action of centrifugal force on the weights by initially and uniformly reactive effect against adjacent weight ends at zero or low speeds but by a differentially reactive effect against the two weights, at substantially normal speeds, in the manner hereinbefore set forth. As noted above, it has been found that a simple device of this kind is effective to prevent rattle, under practically all load conditions.

Referring particularly to Fig. 3 of the drawings, I have there shown a disc 51 operatively associated with shell 16 to insure that one of the springs 29 shall not fall out of its recess 28, and a resilient dished member 52 may be located between the rotor 12 and the weights in order to provide proper spacing therebetween, as well as to prevent the other spring 29 from falling out of its recess.

The device embodying my invention thus provides a relatively simple and highly effective means for preventing rattle of a driving pin in a weight leading the same, and it is to be understood that, while I have illustrated a particular direction of rotation, the weights will move into substantially symmetrical opposite positions relative to the pins when the direction of rotation is reverse, so that a weight is driven by a pin trailng the same and located in a recess in a trailing edge of the weight.

Reference is here made to copending applications Serial No. 527,190 filed April 2, 1931 by H. D. Else and C. R. Libby, Serial No. 522,291, filed March 13, 1931 by G. A. Leyner, and Serial No. 527,192, filed April 2, by C. R. Libby, all assigned to Westinghouse Electric & Manufacturing Company.

Various modifications may be made in the device embodying my invention without departing from the spirit and the scope of the invention, and I desire therefore, that only such limitations shall be placed thereon as are imposed by the prior art or are set forth in the appended claims.

I claim as my invention:

1. In a clutch including a driven shell, a centrifugally-actuable weight therein disposed to engage the shell at a predetermined speed and having a recess at its trailing edge, of approximately V-shape, a pin fitting into the recess for driving a weight leading it, a resilient member engaging the weight to prevent engagement thereof with the shell until a predetermined speed of rotation has been reached, and a resilient member on the pin and engaging the weight to maintain a close wedging interfit of the pin in the recess of the weight under all operating conditions.

2. In a clutch including a driven shell, a contrifugally-actuable weight therein disposed to engage the shell at a predetermined speed and having a recess at its trailing edge, of approximately V-shape, a pin fitting into the recess for driving the weight leading it, a resilient member engaging the weight to prevent engagement thereof with the shell until a predetermined speed of rotation has been reached, and a resilient member between the pin and one wall of the recess in said weight to maintain a close interfit of the pin in the recess to prevent rattle of the weight on the pin under pulsating-torque conditions of the driving pin.

3. In a clutch including a driven shell, a centrifugally-actuable weight therein disposed to engage the shell at a predetermined speed and having a recess at its trailing edge, of approximately V-shape, a pin fitting into the recess for driving the weight leading it, a resilient member engaging the weight to prevent engagement thereof with the shell until a predetermined speed of rotation has been reached, and a leaf spring engaging the weight to maintain a close wedging interfit of the weight on the pin under all operation conditions.

4. In a clutch including a driven shell, a plurality of centrifugally-actuable weights in the shell disposed to engage it at a predetermined speed, each weight having a recess at each radial edge, of approximately V-shape, a resilient spring engaging the weights to prevent engagement thereof with the shell until a predetermined speed of rotation has been reached, a pin fitting into each pair of recesses to effect driving of the respective weights by a pin trailing a weight, and a plurality of resilient means each operatively engaging a pin and a pair of adjacent weights with a predetermined initial stress therein to prevent rattle of a leading weight on a trailing pin under pulsating-torque operation.

5. In a clutch including a driven shell, a plurality of centrifugally-actuable weights in the shell disposed to engage it at a predetermined speed, each weight having a recess at each radial edge, of approximately V-shape, a resilient spring engaging the weights to prevent engagement thereof with the shell until a predetermined speed of rotation has been reached, a pin fitting into each pair of recesses to effect driving of the respective weights by a pin trailing a weight, a plurality of resilient means each operatively engaging a pin and a pair of adjacent weights and differentially effective relatively to the pair of weights to maintain the pin trailing and driving a weight in close wedging interfit in the trailing recess thereof to prevent rattle of the weight on the pin under pulsating-torque conditions.

6. In a clutch including a driven shell, a plurality of centrifugally-actuable weights disposed in the shell to effect driving engagement between the leading peripheral surface-portion of a weight and the shell at a predetermined speed, each weight having a recess at each radial edge of approximately V-shape, a garter spring on the weights to prevent such driving engagement until a predetermined speed has been reached, a driving pin in each pair of adjacent recesses to effect driving of the respective weights by a pin trailing a weight, in accordance with the direction of rotation of the clutch, and a plurality of resilient means each operatively engaging a pin and two adjacent weights with a predetermined initial reactive pressure therebetween, the radially outward movement of the leading portion of a weight acting on the resilient means of a pin leading that weight to ensure a tight wedging interfit of said pin in a weight leading it under all conditions of operation.

7. In a clutch including a driven shell, a plurality of centrifugally-actuable weights disposed in the shell to effect driving engagement between the leading peripheral surface-portion of a weight and the shell at a predetermined speed, each weight having a recess at each radial edge, of approximately V-shape, a garter spring on the weights to prevent such driving engagement until a predetermined speed has been reached, a driving pin in each pair of adjacent recesses to effect driving of the respective weights by a pin trailing a weight, in accordance with the direction of rotation of the clutch, and a plurality of leaf springs, each having its mid-portion engaging a pin and its end-portions engaging adjacent weights to provide an initial stress between the pin and a pair of adjacent weights and effect a tight wedging and driving interfit of a trailing pin in a leading weight under all operation conditions.

In testimony whereof, I have hereunto subscribed my name this 24th day of March, 1931.

HARRY D. ELSE.